US010146446B1

(12) United States Patent
Anchi et al.

(10) Patent No.: US 10,146,446 B1
(45) Date of Patent: Dec. 4, 2018

(54) DATA STORAGE SYSTEM WITH PORT CONGESTION HINTING FOR HOST MULTIPATHING

(71) Applicant: EMC IP Holding Company LLC, Hopkinton, MA (US)

(72) Inventors: Amit Pundalik Anchi, Bangalore (IN); Srinivas Kangyampeta, Bangalore (IN); Ankur Dixit, Bangalore (IN); Noufal Muhammed, Palakkad (IN); Jaeyoo Jung, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/582,711

(22) Filed: Apr. 30, 2017

(51) Int. Cl.
*G06F 3/06* (2006.01)
*G06F 13/40* (2006.01)

(52) U.S. Cl.
CPC .......... *G06F 3/0613* (2013.01); *G06F 3/0635* (2013.01); *G06F 3/0673* (2013.01); *G06F 13/4022* (2013.01)

(58) Field of Classification Search
CPC .. G06F 3/0613; G06F 13/4022; G06F 3/0635; G06F 3/0673
See application file for complete search history.

(56) References Cited

U.S. PATENT DOCUMENTS

| 9,258,242 B1* | 2/2016 | Mallick | H04L 47/2425 |
| 9,720,601 B2* | 8/2017 | Gupta | G06F 3/0611 |
| 2009/0172666 A1 | 7/2009 | Yahalom et al. | |

* cited by examiner

*Primary Examiner* — Ernest Unelus
*Assistant Examiner* — Ronald T Modo
(74) *Attorney, Agent, or Firm* — BainwoodHuang

(57) ABSTRACT

A data processing system includes host computers and a data storage system that (1) periodically calculates port congestion values for storage system ports based on per-port values for (a) a number of storage IO commands being processed by each port and (b) CPU utilization of one or more CPUs assigned to each port, and (2) periodically sends the port congestion values to the host computers. Each host computer includes multipathing logic for selectively directing storage IO commands on selected paths to the data storage system. The multipathing logic receives the port congestion values from the data storage system and utilizes the port congestion values for path selection by preferentially directing first storage IO commands of higher service level objective to storage system ports having lower congestion and preferentially directing second storage IO commands of lower service level objective to storage system ports having higher congestion.

20 Claims, 5 Drawing Sheets

DATA STORAGE SYSTEM WITH PORT CONGESTION HINTING FOR HOST MULTIPATHING

BACKGROUND

The present invention relates to the field of data storage, and in particular to data processing systems employing host multipathing logic that selectively directs storage input-output (IO) commands on different paths to data storage systems, which are also referred to as "storage arrays" or simply "arrays" herein.

Traditional multipath load balancing algorithms make path decisions based on individual host level IO statistics. Such statistics can include, for example, Read/Write IO count, size of each IO in number of blocks, latency as parameter to load balance the IO on available storage system ports. These parameters ensures fair distribution of IO on the available host bus initiators.

SUMMARY

There are disadvantages to the above approach in which host multipathing logic makes decisions based on only individual host level IO statistics. These include:

1. Uneven distribution of multi-host 10 load to the storage system ports/controllers in a datacenter. Using only the above parameters, host multipathing software is not aware of other hosts' IO activity on the storage system ports or actual congestion at the storage ports as seen/received by the storage system. Performance of host applications may suffer.
2. Inefficient storage system resource utilization. In a datacenter with uneven IO distribution of IO load on the storage system ports from the hosts, the storage system may have under-utilized and/or over-utilized resources.
3. IO prioritization based on storage service level objective (SLO) is not guaranteed due to uneven IO distribution on the storage system.

Disclosed is a technique that enables host multipathing software to know actual data storage system port congestion and storage system resource utilization level to consider when balancing the IO load on to the storage system ports. The solution not only helps overcome the disadvantages highlighted above and provides an opportunity to work with underlying storage SLO and prioritize the IO load accordingly.

More particularly, to improve the above described situation and add performance improvement to higher tiered applications, multipathing logic in a host computer can do the following:

1. Obtain information about storage SLO that the application is configured for.
2. Obtain information from the data storage system on congestion level at each port relative to the actual congestion rate on the controller as calculated with availability of storage system resources and their utilization.
3. In a virtual environment, map the IO to its source application. This enables the application to be monitored for meeting a service level agreement (SLA).

Thus a data processing system is disclosed that includes host computers executing respective applications with respective storage IO workloads, the host computers including respective host ports, and a data storage system having storage system ports coupled to the host ports of the host computers to receive storage IO commands therefrom and to send storage IO responses thereto.

The data storage system is configured and operative to (1) periodically calculate port congestion values for the storage system ports based on per-port values for (a) a number of storage IO commands being processed by each port and (b) CPU utilization of one or more CPUs assigned to each port, and (2) periodically send the port congestion values to the host computers. In one embodiment, the port congestion information is based on a combination of CPU utilization (e.g., idle time) and the number of active jobs/commands per port.

Each host computer includes respective multipathing logic for selectively directing storage IO commands of the host computer on selected paths to the data storage system, each path including a pairing of a respective host port and respective storage system port. The multipathing logic is configured and operative to receive the port congestion values from the data storage system and utilize the port congestion values for path selection by preferentially directing first storage IO commands of higher service level objective to storage system ports having lower congestion and preferentially directing second storage JO commands of lower service level objective to storage system ports having higher congestion.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
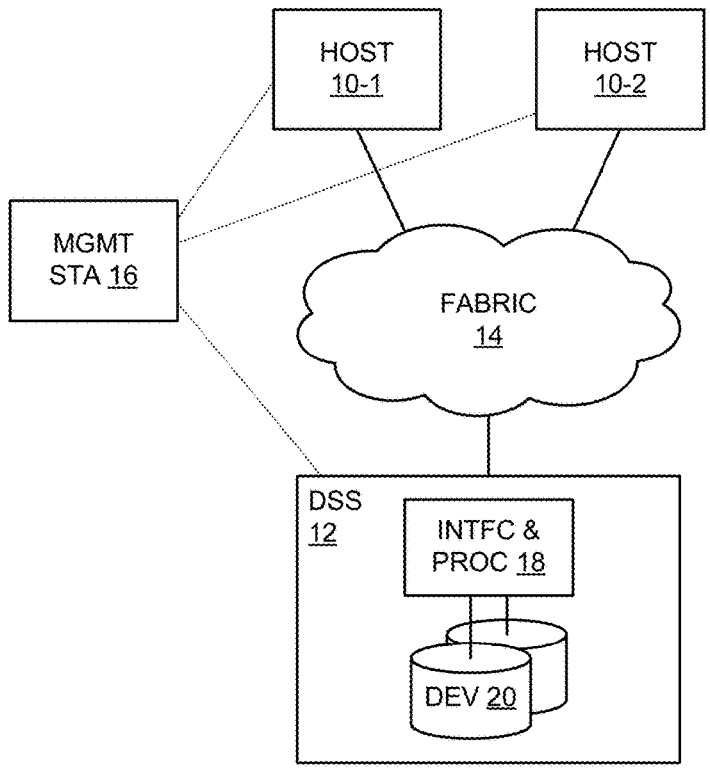
FIG. 1 is a block diagram of a data processing system.

The present description relates to use of multipathing logic within a host computer to distribute storage IO commands & operations across a set of paths in a way that achieves a desired performance for the commands and the applications that generate them. As generally known, a "path" in this context can be described as an I-T-L tuple, referring to Initiator, Target, and LUN, i.e., a path includes a specific Initiator (host) port, a specific Target (data storage system) port, and a particular logical storage unit (LUN) within the data storage system.

In a virtual-processing environment (e.g., VMware or other virtual-computing arrangement), a common deployment use case involves a host having multiple virtual machines running business critical applications/workloads hosted on backend storage available through a storage area network (SAN) fabric. Host connectivity to SAN storage consists of host bus adapters connected to storage array ports through SAN components like switches. This connectivity of host to storage is termed as storage fabric and is shared with all the applications.

In modern software-defined datacenter (SDDC) environments, the applications/VMs are provisioned with storage based on SLO requirements. Array performance is one of SLO that storage system publishes in form of IOs per second (IOPS) and latency, with the class of storage in use. With mixed workload from all applications, where tier 1, tier 2, and tier 3 applications share the same storage fabric, it can be challenging to meet the Service Level Agreements (SLA) at the storage interconnect to each tiered application against the storage SLO.

In one scenario a set of tiered applications are hosted on two hosts with a certain workload distribution, as may be represented by device queue depth for example. A storage fabric is shared between these applications across the hosts. As explained more below, a tier 3 application with a heavy workload may consume s larger share of the storage fabric (as represented with storage system IO distribution) than a tier 1 application, adversely impacting the performance of the tier 1 application. This is due to multipathing software evenly distributing the incoming workload to the hosts' common resources (as may represented by host bus adapter queue depth) in the fabric.

On the storage system side, with a controller having multiple front end ports connected and shared across different hosts in a datacenter, the collective IO load as seen by a controller does not reflect actual congestion rate on its front end ports.

With this lack of insight at the host level, the multipathing software could pick a path to a more congested storage controller for the tier 1 application even though a path to a lower congested controller is available. Also the tier 2 and tier 3 applications could indirectly throttle the IO of the tier 1 applications as they could end up using all the available paths.

There are two observations to be noted in above scenario,
1. Multipathing software works only with host level congestion statistics that does not have visibility of actual congestion on the storage system controller and the ports which is the core of the problem as discussed above.
2. Multipathing software doesn't have visibility of class of storage, all the application IOs of different tiers of storage are serviced equally.

The disclosed technique can resolve the above two observations to meet the efficient storage resources utilization and improve the applications performance.

FIG. 1 shows a data processing system including host computers (HOSTs) 10 (shown as 10-1 and 10-2), a data storage system (DSS) 12, and an interconnection shown as a switching fabric 14. Also included is a management station (MGMT STA) 16 having connections to the hosts 10 and data storage system 12. In a virtualized environment the management station 16 may be a vCenter® server for example. The data storage system 12 includes interface and processing circuitry (INTFC & PROC) 18 as well as a set of data storage devices (DEV) 20 such as Flash arrays, magnetic disks, etc.

In operation, devices 20 provide secondary storage of data used by applications executing in the hosts 10. The applications generate storage IO commands (reads and writes) to access the data, and the fabric 14 forwards the commands to the data storage system 12. In the case of a write, the data storage system 12 writes data to a device 20 according to the command, and returns a response indicating when the write is complete. In the case of a read, the data storage system 12 reads data from a device 20 according to the command, and returns a response with the data that has been read. As generally known, the data storage system 12 may employ a device cache (not shown) that decouples the immediate processing of read and write commands from the underlying physical storage devices 20, generally speeding up operation. Large extents of data may be transferred from a device 20 to the cache, and subsequent reads are satisfied from the device cache with low latency. Similarly, writes may be satisfied by temporarily storing write data in the device cache with low latency, and later de-staging large extents of data from the device cache to a device 20.

As outlined above, there may be multiple paths over which IO commands and responses can be transferred between the hosts 10 and the data storage system 12, and the hosts 10 employ multipathing logic to distribute IO operations across those paths. In the illustrated system the hosts 10 share access to devices 20 of the data storage system 12, and thus contend for use of the resources of the data storage system 12. The present description is directed to techniques for providing and using information regarding congestion at the data storage system 12 to improve the distribution of storage IO operations and thus improve system performance.

Figure 2:
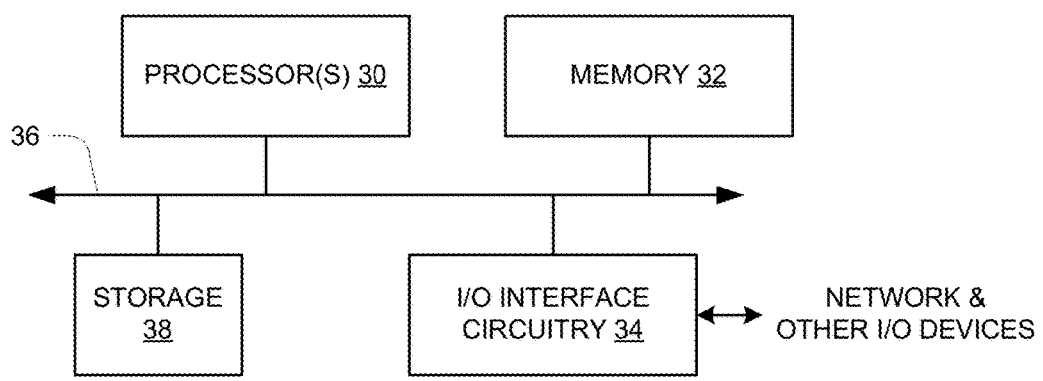
FIG. 2 is a block diagram of computer hardware.

FIG. 2 shows an example configuration of a computer such as a host 10 from a computer hardware perspective. The illustrated arrangement also generally describes the interface and processing circuitry 18 of the data storage system 12. The hardware includes one or more processors 30, memory 32, and interface circuitry 34 interconnected by data interconnections 36 such as one or more high-speed data buses. The interface circuitry 34 provides a hardware connection to the fabric 14 (FIG. 1) and perhaps other external devices/connections (EXT DEVs). The processor(s) 30 with connected memory 32 may also be referred to as "processing circuitry" herein. There may also be local storage 38 such as a local-attached disk drive or Flash drive. In operation, the memory 32 stores data and instructions of system software (e.g., operating system) and one or more application programs which are executed by the processor(s) 30 to cause the hardware to function in a software-defined manner. Thus the computer hardware executing instructions of a data storage application, for example, can be referred to as a data storage circuit or data storage component, and it will be understood that a collection of such circuits or components can all be realized and interact with each other as one or more sets of computer processing hardware executing different computer programs as generally known in the art. Further, the application software may be stored on a non-transitory computer-readable medium such as an optical or magnetic disk, Flash memory or other non-volatile semiconductor memory, etc., from which it is retrieved for execution by the processing circuitry, as also generally known in the art.

Figure 3:
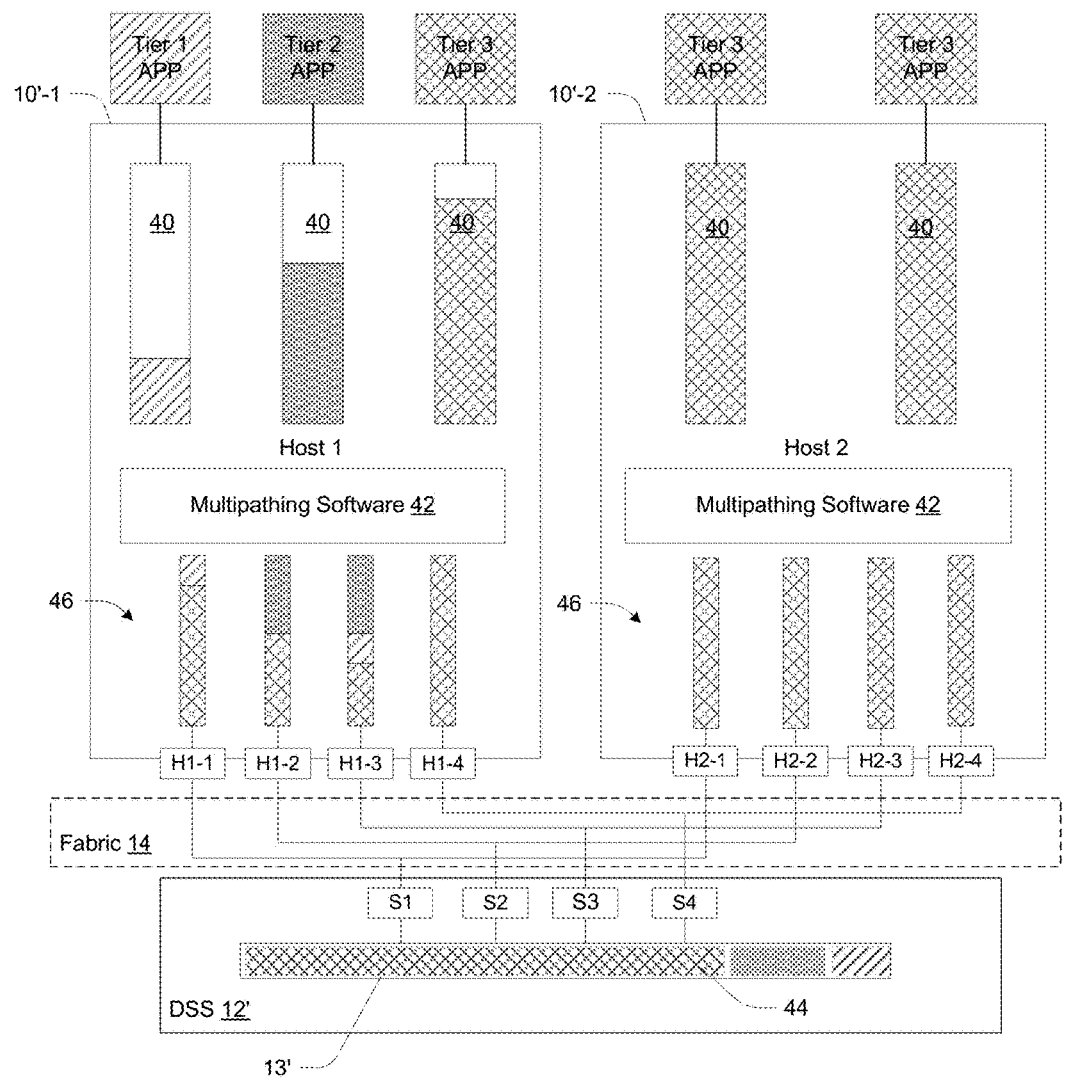
FIG. 3 is a schematic diagram of IO distribution among paths between hosts and a data storage system.

FIG. 3 depicts a scenario using known multipathing logic, demonstrating the above-described shortcomings. A set of tiered applications (APPs) are hosted on two hosts 10'-1, 10'-2 with a certain workload distribution, as represented by device queue depth. Device queues 40 are application-specific queues for IO operations directed to corresponding devices 20 (FIG. 1) of the data storage system 12'. The storage fabric 14 is shared between the applications (APP) across the hosts 10'. The hosts 10' include respective multipathing logic (software) 42 interposed between the device queues 40 and the host ports that connect to the fabric 14. The host ports are identified as H1-1, H1-2, H1-3, H1-4 and H2-1, H2-2, H2-3, H2-4. Ports of the data storage system 12 are shown as S-1, S-2, S-3 and S-4.

As shown in FIG. 3, tier 3 applications with a heavy workload consume a larger share of the storage fabric (as represented by storage system IO distribution 44) than the tier 1 application, impacting the performance of tier 1 application. This is due to the multipathing software 42 evenly distributing the incoming workload to host common resources (as represented by depths of host bus adapter queues 46), without reference to the effect of the workloads of other hosts 10'.

At the data storage system 12 with a controller 13' having multiple front end ports S-x connected and shared across different hosts 10' in a datacenter, the collective IO load as seen by the controller 13' does not reflect the actual congestion rate on its front end ports.

With this lack of insight at the host level, the multipathing software 42 could pick the path to the more congested storage controller 13' for the tier 1 application even though a path to a lower congested controller 13' is available. Also the tier 2 and tier 3 applications could indirectly throttle the IO of the tier 1 applications as they could end up using all the available paths. Thus, as noted above, (1) multipathing software that works only with host level congestion statistics does not have visibility of actual congestion on the storage system controller 13' and the ports S-x, which can create the performance problem as discussed above, and (2) the multipathing software does not have visibility of class of storage, so that all the application IOs of different tiers of storage are serviced equally, contributing to the performance issue.

Figure 4:
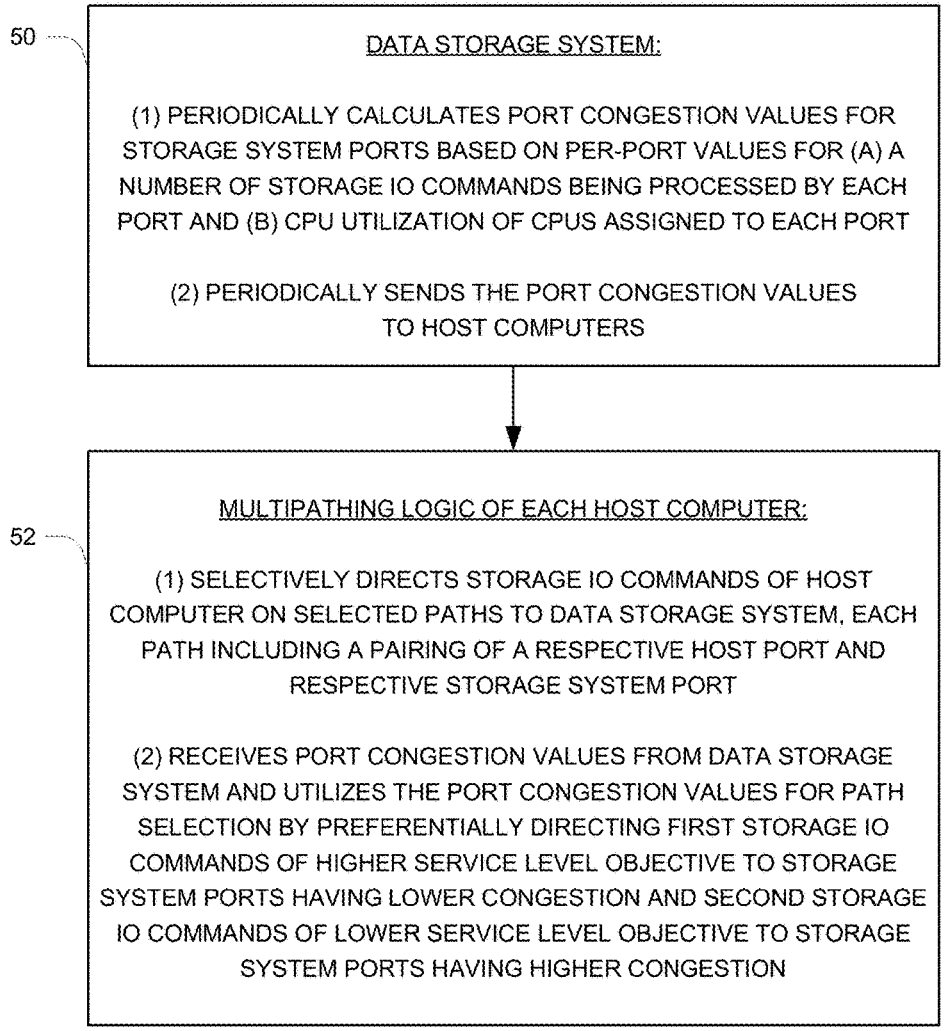
FIG. 4 is a high-level flow diagram of operation of the data processing system.

FIG. 4 is a high-level flow diagram of operation, divided into steps 50 performed by a data storage system (e.g., data storage system 12) and steps 52 performed by multipathing logic of host computers (e.g., multipathing software of hosts 10, as described more below).

At 50, the data storage system (1) periodically calculates port congestion values for the storage system ports based on per-port values for (a) a number of storage IO commands being processed by each port and (b) CPU utilization of one or more CPUs assigned to each port, and (2) periodically sends the port congestion values to the host computers. As mentioned herein, the congestion information may be returned in response to polling by the hosts 10, such as by use of a dedicated SCSI command for example.

At 52, the multipathing logic (1) selectively directs storage IO commands of the host computer on selected paths to the data storage system, each path including a pairing of a respective host port and respective storage system port, and (2) receives the port congestion values from the data storage system and utilizes the port congestion values for path selection by preferentially directing first storage IO commands of higher service level objective to storage system ports having lower congestion and second storage IO commands of lower service level objective to storage system ports having higher congestion.

Detection of SLO and Mapping IO to an Application

The description herein refers to the service level objective or SLO of storage being utilized by respective applications. Various techniques can be used to obtain SLO information. In a virtualized environment, certain APIs for storage awareness (e.g., VASA APIs) can be used by VMware hosts 10 or the management station 16 to communicate to the data storage systems 12. Using these APIs, the management station 16 can obtain a list of virtual machines (VMs) on a host 10 which are consuming storage of a particular SLO. There is a possibility that the SLO of the storage associated with a VM could change. The changes to SLO can happen if a VM backing logical storage unit (LUN) migrates to a new LUN with lesser or higher SLO. Changes to a VM's storage SLOs can be identified by the management station 16 at regular intervals of time using the same APIs. This can be further improved if the management appliance becomes aware of any DRS or Storage vMotion operations.

The source VM of any IO in a VMware environment can be identified using available kernel APIs. Similar methods can be employed in other platforms to map the applications to IOs received at the multipathing layer.

Method to Detect Data Storage System Port Congestion

The hosts 10 can send a predefined vendor SCSI command to the data storage system 12 to obtain the real time congestion in a port S-x. The command could either request a specific port's congestion or could request congestion data for all the ports that are visible to the host 10. This SCSI command could be sent in a periodic manner and the returned data is updated into an internal data structure of the multipathing logic. This will act as an input to multipathing logic to account for congestion in the fabric 14.

Figure 5:
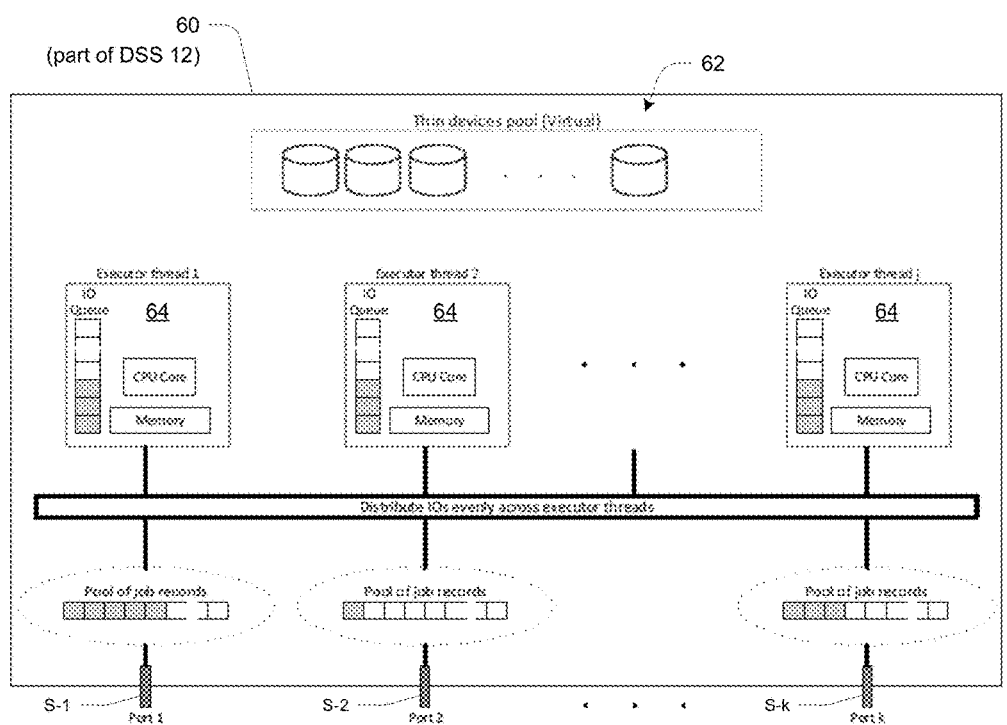
FIG. 5 is a schematic diagram of processing by a front end emulation of a data storage system.

FIG. 5 outlines overall IO processing flow by a logical processing entity referred to as a "front end emulation" or FA 60 within the data storage system 12. Note that the ports S-x are shown at the bottom and the devices 62 at the top of FIG. 5.

Port congestion detection is dependent on the storage system architecture. In one example the data storage system 12 is an active/active storage array where a device 62 can be accessed through one or more ports simultaneously. Hosts 10 connect to the data storage system 12 through front end emulations (FAs) 60, each of which has a number (e.g., from 1 to 60) of executor threads 64 running. For an TO, the major part of front end processing is done by an assigned executor thread 64. When an IO arrives through any of the FA ports S-x, after the initial driver level processing, the IO is allocated a job record, which is a memory buffer that stores the information about the IO. The FA 60 then selects an executor thread 64 and assigns it to further process this IO. The executor thread 64 is chosen in such a way that all the executor threads 64 in an FA 60 are evenly loaded. By this way, even if an IO burst occurs through a particular port, the IO processing workload is distributed across the threads/cores. Indirectly this provides dynamic port to core mapping.

Port congestion is detected by considering two parameters, CPU utilization (represented by CPU idle time) and number of jobs active in the port.

1. Percentage of CPU idle time

Each port S-x is mapped to a particular FA 60, and each FA 60 has a set of CPU cores allotted to it. Here "CPU core" refers to a single-stream execution unit within a multi-core CPU integrated circuit contained within the interface and processing circuitry 18 (FIG. 1). The idle time of mapped CPU cores reflects how congested the FA 60 is. Higher idle time means the FA 60 is less congested. This congestion rate in the FA 60 reflects directly on the ports S-x mapped to it. For all ports S-x connected to the same FA 60, the percentage of CPU idle time is the same.

2. Number of jobs in the port

Each port S-x has a fixed size of memory and bandwidth. More jobs leads to competition for these port resources. So the number of jobs in the port is generally proportional to the level of port congestion. This number can vary per port even for ports all connected to the same FA 60.

Pseudocode Description of the Port Congestion Rate Calculation

The following presents one implementation of port congestion rate calculation as may be performed by a data storage system.

Constants:
MAX_NUM_OF_ENGINES=8
MAX_NUM_OF_BOARDS=2*MAX_NUM_OF_ENGINES=16
MAX_NUM_OF_FRONT_END_EMULATIONS_PER_BOARD=3(1FC+1ISCSI+1FCOE)
MAX_NUM_OF_FRONT_END_EMULATIONS_IN_ARRAY=16*MAX_NUM_OF_FRONT_END_EMULATIONS_PER_BOARD=48
MAX_NUM_OF_PHY_CORES_PER_CPU=12 MAX_NUM_OF_PHY_CPU_CORES_PER_BOARD= 2*MAX_NUM_OF_PHY_CORES_PER_CPU=24
MAX_NUM_OF_PORTS_PER_BOARD=32
MAX_NUM_OF_PORTS_PER_FRONT_END_EMULATION=32
MAX_NUM_OF_PORTS_IN_ARRAY=16*MAX_NUM_OF_PORTS_PER_BOARD=512
MAX_NUM_OF_JOBS_PER_PORT=4608
TIME_PERIOD=1 ms
SAMPLING_RATE_PER_MILLI_SEC=10

Notation:
$T_t$=Time sample t, where $0 \leq t <$ SAMPLING_RATE_PER_MILLI_SEC
$D_i$=$i^{th}$ front end emulation, where $0 \leq i <$ MAX_NUM_OF_FRONT_END_EMULATIONS_IN_ARRAY
$C_j^i$=CPU core j that mapped to front end emulation $D_i$, where $j \leq 0 <$ MAX_NUM_OF_PHY_CPU_CORES_PER_BOARD
Idle_$C_j^{i,T_t}$=Percentage of CPU idle time for core $C_j^i$ at time sample $T_t$
Avg_Idle_$C_j^i$=Average percentage of CPU idle time for core $C_j^i$
Avg_Idle_$D_i$=Average percentage of CPU idle time for front end emulation $D_i$
$R_i$=Rank of front end director $D_i$
$port_k$=$k^{th}$ port, where $0 \leq k <$ MAX_NUM_OF_PORTS_IN_ARRAY
avg_$bcr_k$=Average base congestion rate for $port_k$
$J_k^{T_t}$=Number of jobs in port $port_k$ at time sample $T_t$
Avg_$J_k$=Average number of jobs in port $port_k$
Avg_$per_k$=Average port congestion rate for $port_k$ Port Congestion Rate Calculation:
Step 1: Calculate average percentage of CPU idle time for each cores
Step a: Read percentage of CPU idle time for each core, in every sample time.
Step b: Calculate average percentage of CPU idle time for each cores.

$$\text{Avg\_Idle\_}C_j^i = \frac{\text{Idle\_}C_j^{i,T_0} + \text{Idle\_}C_j^{i,T_1} + \ldots + \text{Idle\_}C_j^{i,T_{SAMPLE\_RATE\_PER\_MILLI\_SEC}}}{\text{SAMPLING\_RATE\_PER\_MILLI\_SEC}}$$

Step 2: Calculate average percentage of CPU idle time for each front end emulation $$\text{Avg\_Idle\_}D_i = \frac{\text{Avg\_Idle\_}C_{j_1}^i + \text{Avg\_Idle\_}C_{j_2}^i + \ldots + \text{Avg\_Idle\_}C_{j_n}^i}{n}$$

Let set Avg_Idle_D={Avg_Idle_$D_1$,Avg_Idle_$D_2$ ... Avg_Idle_$D_x$}

Step 3: Sort the set Avg_Idle_D in descending order.
Let set Sorted_Avg_Idle_D={Avg_Idle_$D_p$, Avg_Idle_$D_q$ ... Avg_Idle_$D_r$}
Step 4: Calculate rank for each front end emulation
Rank $R_i$ is equal to the rank of Avg_Idle_$D_i$ in the Sorted_Avg_Idle_D
For example, in rted_Idle_D={Avg_Idle_$D_p$, Avg_Idle_$D_q$ ... Avg_Idle_$D_r$}, the rank $R_p$=0, $R_q$=1 and so on.
Step 5: Calculate average base congestion rate
Base congestion rate for a port is equal to the multiple of MAX_NUM_OF_JOBS_PER_PORT and rank of director mapped to that port.
For example, $r_k$=MAX_NUM_OF_JOBS_PER_PORT*$R_i$, where $R_i$ is the rank of $D_i$ that mapped to port $port_k$.
Step 6: Calculate average number of jobs per port
Step a: Read number of jobs per port, in every sample time.
Step b: Calculate average number of jobs per port $$\text{Avg\_}J_k = \frac{J_k^{T_0} + J_k^{T_1} + \ldots + J_k^{T_{SAMPLING\_RATE\_PER\_MILLI\_SEC}}}{\text{SAMPLING\_RATE\_PER\_MILLI\_SEC}}$$

Step 7: Calculate average port congestion rate
Average Port congestion rate is the sum of average base congestion rate and average number of jobs.

Avg_$per_k$=Avg_$bcr_k$+Avg_$j_k$

Host Use of Port Congestion Information

The multipathing logic of the hosts 10 utilizes the ports congestion data according to a load balancing policy to order the paths to a device 10, based on calculated congestion data.

Before dispatching an IO on any path, the load balancing algorithm takes account of current SLO level of the underlying storage and decides which of the set of paths the IO should be sent to. A simple and straightforward algorithm in an ideal condition is to dispatch the IO in the following way:

IO to a BRONZE (lowest-level) storage SLO is dispatched on the most congested path IO to a GOLD (highest-level) storage SLO is dispatched on the least congested path IO to a SILVER (mid-level) storage SLO might be dispatched on paths having congestion that is intermediate between the highest and lowest The algorithm should account for refreshing congestion data at a periodic interval and based on calculations of:
  i) Latency X for GOLD class
  ii) Latency Z for BRONZE class
Trigger a refresh for congestion data from array ports if X is greater than Z.

The congestion data for the array ports visible to the host is retrieved by the hosts 10 in a separate kernel thread and stored in internal data structures. These data structures are refreshed at a periodic interval.

The IO load balancing algorithm accounts for SLO and the current congestion stored in the internal kernel data structures to determine the path to be used for completion of the IO. Depending on the SLO of the storage to which IO is directed:

1. For the highest SLO, the following is performed for every eligible path
  a. Obtain information about the least congested port(s) and the paths associated with it
  b. Calculate the current number of pending IOs for both read and write from the internal data structures Using these calculated values, for each of the paths a weight is calculated and the path with the lowest weight is selected for the IO.

2. For the lowest SLO, the following is performed for every path
  a. Obtain information about the highest congested port(s) and the paths associated with it
  b. Calculate the current number of pending IOs for both read and write from the internal data structures Using these calculated values, the path with the highest congestion value is determined and that path is selected for the dispatch of the IO.

3. For the medium SLOs, the following is performed for every path
  a. Using the current congestion data of all the ports associated with paths of the device, determine the congestion values for each of the paths
  b. Calculate the current number of pending IOs for both read and write from the data structures Using these calculated values, the paths with medium congestion value are determined and one of these paths is selected for the dispatch of the IO.

Figure 6:
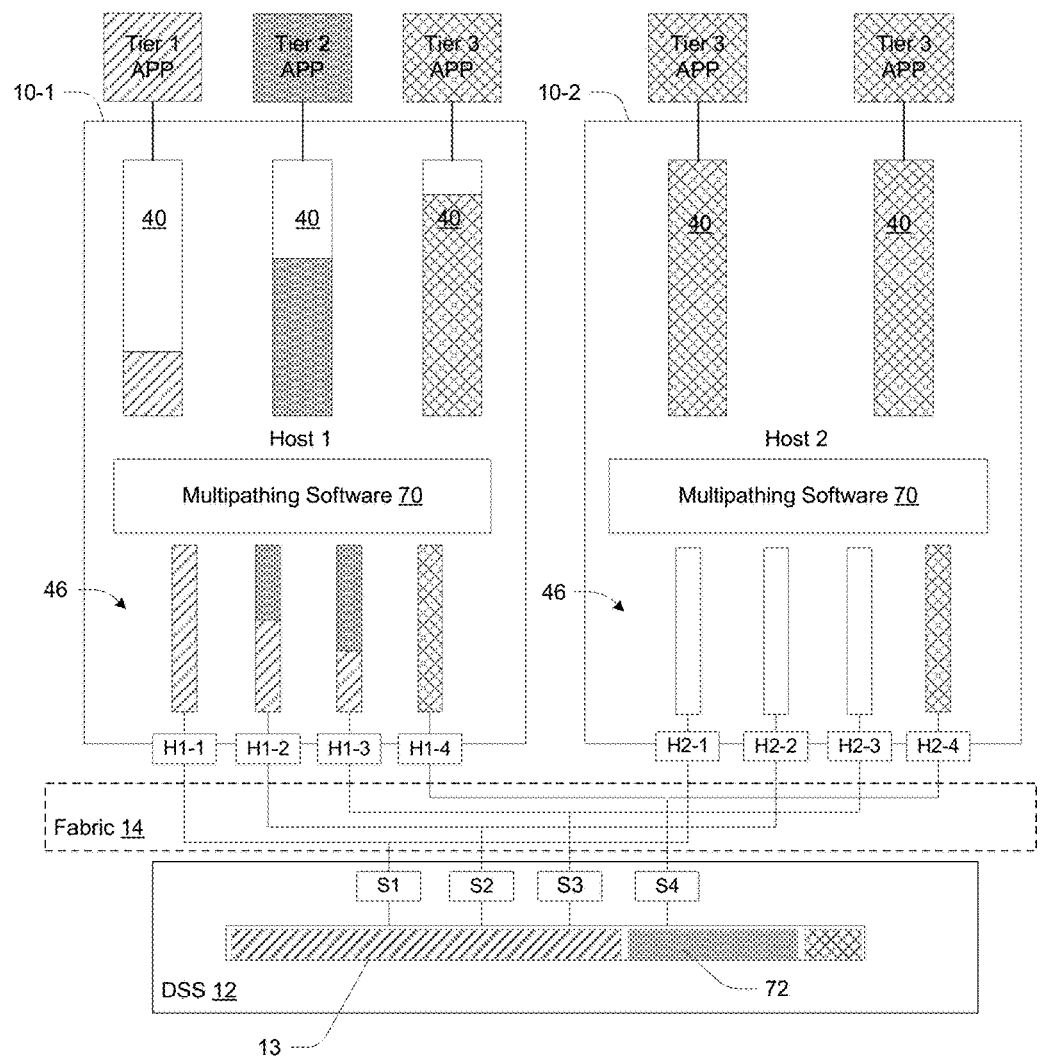
FIG. 6 is a schematic diagram of IO distribution among paths between hosts and a data storage system.

FIG. 6 describes a result of using the above algorithm, which in particular alleviates the problem faced by the tier 3 applications as described above with reference to FIG. 3. FIG. 6 shows the use of alternative multipathing software 70 that incorporates the above-described use of port congestion information in assigning storage IOs to paths. It also shows a resulting different utilization of the host adapter queues 46 and storage system IO distribution 72 (controller 13) than that shown in FIG. 3.

In an assumed scenario, storage system port S-4 is the relatively most congested and S-1 is the least congested port prior to applying the new algorithm; ports S-2 and S-3 are medium congested port of the storage system 12. The host connectivity shows two hosts H1 and 112 connected to a common storage system 12 as follows:

Host ports H1-1 and H2-1 connected to DSS port S-1
  Host ports H1-2 and H2-2 connected to DSS port S-2
  Host ports H1-3 and 112-3 connected to DSS port S-3
  Host ports H1-4 and 112-4 connected to DSS port S-4

With the IO load distribution from the different tiered application where tier 1 application is configured or provisioned with higher SLO storage, and lower tiered application (2, 3) is configured or provisioned with lower SLO storage, the effect is shown of the new algorithm that takes into account storage system port congestion to priorities the bandwidth of tiered application based on the SLO. The tier 3 IO load is mostly re-directed to the most congested port, here S-4. Also, the tier 1 application IO load is re-directed to the least congested port S-1, and the medium tiered application IO load utilizes the medium congested ports S-2 and S-3. Also shown is some usage of ports S-2 and S-3 by tier 1 application, indicating that at a given time these ports were less congested than S-1 so the tier 1 application workload is distributed on these ports as well. As the host H2 is hosting only tier 3 applications, the IO distribution doesn't utilize all the available host/storage ports but uses only ports 112-4 and S-4.

It should be noted that the solution described herein could be enhanced to provide port congestion hints by way of notification events to an end user or to orchestration (DRS) software, to move or migrate applications to different hosts or storage to improve the performance of the application and meet an application SLA.

Thus a disclosed data processing system includes a plurality of host computers executing respective applications with respective storage IO workloads, the host computers including respective host ports, and a data storage system having storage system ports coupled to the host ports of the host computers to receive storage IO commands therefrom and to send storage IO responses thereto. The data storage system is configured and operative to (1) periodically calculate port congestion values for the storage system ports based on per-port values for (a) a number of storage IO commands being processed by each port and (b) CPU utilization of one or more CPUs assigned to each port, and (2) periodically send the port congestion values to the host computers. Each host computer includes respective multipathing logic for selectively directing storage IO commands of the host computer on selected paths to the data storage system, each path including a pairing of a respective host port and respective storage system port. The multipathing logic is configured and operative to receive the port congestion values from the data storage system and utilize the port congestion values for path selection by preferentially directing first storage IO commands of higher service level objective to storage system ports having lower congestion and preferentially directing second storage IO commands of lower service level objective to storage system ports having higher congestion.

In specific embodiments:
  There is a shared fabric between the hosts and data storage system
  The storage system ports include front end emulations (FAs) with respective queues and are assigned to respective CPU cores, so that CPU utilization differentiates the FAs
  A particular specific congestion calculation is used that includes both CPU utilization (idle time) and jobs/port
  A particular load balancing method is used by the multipathing logic at the host computers, as described above
  The applications may be tiered, and the storage also categorized by service level objective (SLO), e.g., Bronze, Silver, Gold
  Congestion information is reported by polling, e.g., using a vendor-specific SCSI command
  The technique can be used in a virtualized environment, and a mapping to application with a service level agreement (SLA) also exists; SLO may be detected by management operation (e.g. VASA API)

Aspects of the above data processing system may be included separately in a data storage system or host computer, and may be used in other ways. For example, a data storage system providing congestion information may be utilized in a data processing system in which the congestion information is used for purposes other than path selection, such as moving workloads among different hosts or LUNs for example. Similarly, a host performing multipathing as described herein may obtain port congestion information in some other way, e.g., via a specialized appliance rather than from the data storage system.

While various embodiments of the invention have been particularly shown and described, it will be understood by those skilled in the art that various changes in form and details may be made therein without departing from the spirit and scope of the invention as defined by the appended claims.

What is claimed is:
1. A data processing system, comprising:
  a plurality of host computers executing respective applications with respective storage IO workloads, the host computers including respective host ports; and a data storage system having storage system ports coupled to the host ports of the host computers to receive storage IO commands therefrom and to send storage IO responses thereto, the data storage system being configured and operative to (1) periodically calculate port congestion values for the storage system ports based on per-port values for (a) a number of storage IO commands being processed by each port and (b) CPU utilization of one or more CPUs assigned to each port, and (2) periodically send the port congestion values to the host computers, each host computer including respective multipathing logic for selectively directing storage IO commands of the host computer on selected paths to the data storage system, each path including a pairing of a respective host port and respective storage system port, the multipathing logic being configured and operative to receive the port congestion values from the data storage system and utilize the port congestion values for path selection by preferentially directing first storage IO commands of higher service level objective to storage system ports having lower congestion and preferentially directing second storage IO commands of lower service level objective to storage system ports having higher congestion.

2. The data processing system of claim 1, further including a fabric containing the paths on which the storage IO commands and corresponding responses are sent between the host computers and the data storage system, and wherein:

the first storage IO commands of higher service level objective are storage IO commands of a first-tier application executing on a first host computer, and the second storage IO commands of lower service level objective are storage IO commands of a lower-tier application executing on a second host computer, the lower-tier application having a respective workload that would, in the absence of the preferential directing of the first and second storage IO commands, consume a larger share of the fabric than a respective workload of the first-tier application.

3. The data processing system of claim 1, operating in a virtualized environment in which the host computers host virtual machines whose storage IO commands have respective service level objectives, the host computers using an application programming interface for storage awareness to make the multipathing logic aware of the service level objectives of the storage IO commands.

4. The data processing system of claim 3, a host computer using an application programming interface obtains a list of virtual machines on the host computer which are consuming storage of a particular service level objective.

5. The data processing system of claim 1, wherein the host computers send a vendor SCSI command to the data storage system to obtain the port congestion values.

6. The data processing system of claim 5, wherein the vendor SCSI command is either a first type that requests a specific port's congestion value and is repeated for each port, or a second type requesting congestion values for all the ports visible to the host computer, the vendor SCSI command being sent in a periodic manner and the returned data being updated into an internal data structure of the multipathing logic.

7. The data processing system of claim 1, wherein the data storage system includes front end emulations through which the host computers connect to storage resources, the front end emulations employing executor threads to provide a major part of front end processing of the storage IO commands.

8. The data processing system of claim 7, wherein the front end emulations are configured and operative to process each received storage IO command by (1) allocating a respective job record including a memory buffer that stores information about the storage IO command, (2) selecting an executor thread and assigning it to further process the storage IO command, the executor thread being chosen to evenly load the set of executor threads of the front end emulation.

9. The data processing system of claim 1, wherein the port congestion values are calculated based on CPU utilization and number of active jobs in each port.

10. The data processing system of claim 9, wherein each port has a set of allocated CPU cores and the CPU utilization part of the port congestion value calculation includes determining idle time of allocated CPU cores, with higher idle times being interpreted as less CPU utilization.

11. The data processing system of claim 10, wherein the port congestion value calculation includes:

in a first step, calculating an average percentage of CPU idle time for each CPU core;

in a second step, calculating an average percentage of CPU idle time for each of a set of front end emulations using the CPU cores;

in a third step, sorting the average percentages of CPU idle time in descending order;

in a fourth step, calculating a rank for each of the front end emulations from the sorted average percentages;

in a fifth step, calculating an average base congestion rate per port based on the ranks of the front end emulations;

in a sixth step, calculating an average number of jobs per port; and in a seventh step, calculating an average port congestion rate from the average base congestion rate and average number of jobs per port.

12. The data processing system of claim 1, wherein the host computers are configured and operative to (a) monitor respective latencies of the first and second storage IO commands, and (b) refresh the port congestion values from the data storage system upon the latencies for the first storage IO commands becoming greater than the latencies for the second storage IO commands.

13. The data processing system of claim 1, wherein the multipathing logic is operative:

(1) for the higher service level objective and every eligible path, (a) obtain information about the least congested port(s) and the paths associated therewith, (b) calculate a current number of pending read and write storage IO commands, (c) calculate respective path weights based on the calculated values, and (d) selecting a path with a lowest weight for each first storage IO command; and (2) for the lower service level objective and every eligible path, (a) obtain information about the more congested port(s) and the paths associated therewith, (b) calculate a current number of pending read and write storage IO commands, and (c) selecting a path with a highest congestion value for each second storage IO command.

14. A method of operating a data processing system having a plurality of host computers and a data storage system, the host computers including respective host ports and executing respective applications with respective storage IO workloads, the data storage system having storage system ports coupled to the host ports of the host computers to receive storage IO commands therefrom and to send storage IO responses thereto, comprising:

by the data storage system, (1) periodically calculating port congestion values for the storage system ports based on per-port values for (a) a number of storage IO commands being processed by each port and (b) CPU utilization of one or more CPUs assigned to each port, and (2) periodically sending the port congestion values to the host computers; and by respective multipathing logic of each of the host computers, for selectively directing storage IO commands of the host computer on selected paths to the data storage system, each path including a pairing of a respective host port and respective storage system port, (1) receiving the port congestion values from the data storage system, and (2) utilizing the port congestion values for path selection by preferentially directing first storage IO commands of higher service level objective to storage system ports having lower congestion and preferentially directing second storage IO commands of lower service level objective to storage system ports having higher congestion.

15. The method of claim 14, wherein the data processing system further includes a fabric containing the paths on which the storage IO commands and corresponding responses are sent between the host computers and the data storage system, and wherein:

the first storage IO commands of higher service level objective are storage IO commands of a first-tier application executing on a first host computer, and the second storage IO commands of lower service level objective are storage IO commands of a lower-tier application executing on a second host computer, the lower-tier application having a respective workload that would, in the absence of the preferential directing of the first and second storage IO commands, consume a larger share of the fabric than a respective workload of the first-tier application.

16. The method of claim 14, operating in a virtualized environment in which the host computers host virtual machines whose storage IO commands have respective service level objectives, the host computers using an application programming interface for storage awareness to make the multipathing logic aware of the service level objectives of the storage IO commands.

17. The method of claim 16, wherein a host computer using an application programming interface obtains a list of virtual machines on the host computer which are consuming storage of a particular service level objective.

18. The method of claim 14, wherein the host computers send a vendor SCSI command to the data storage system to obtain the port congestion values.

19. The method of claim 18, wherein the vendor SCSI command is either a first type that requests a specific port's congestion value and is repeated for each port, or a second type requesting congestion values for all the ports visible to the host computer, the vendor SCSI command being sent in a periodic manner and the returned data being updated into an internal data structure of the multipathing logic.

20. The method of claim 14, wherein the data storage system includes front end emulations through which the host computers connect to storage resources, the front end emulations employing executor threads to provide a major part of front end processing of the storage IO commands.

* * * * *